United States Patent
Horton et al.

[11] Patent Number: 5,533,093
[45] Date of Patent: Jul. 2, 1996

[54] AUTOMATED TROUBLE-SHOOTING MECHANISM RESIDENT IN CRAFTSPERSON'S PORTABLE TEST AND COMMUNICATIONS DEVICE

[75] Inventors: Michael D. Horton, Ojai; Onofrio Schillaci, Camarillo; Raymond W. Rischpater, Felton, all of Calif.

[73] Assignee: Harris Corporation, Melbourne, Fla.

[21] Appl. No.: 343,699

[22] Filed: Nov. 14, 1994

Related U.S. Application Data

[63] Continuation-in-part of Ser. No. 235,317, Apr. 29, 1994.
[51] Int. Cl.⁶ ..................................................... H04M 1/24
[52] U.S. Cl. ...................................... 379/21; 379/27
[58] Field of Search .................................. 375/1, 21, 24, 375/27, 29, 30, 34

[56] References Cited

U.S. PATENT DOCUMENTS

4,837,811  6/1989  Butler et al. ..................... 379/21 X
4,943,993  7/1990  Fore ..................................... 379/22

*Primary Examiner*—Stephen Chin
*Assistant Examiner*—Paul Loomis
*Attorney, Agent, or Firm*—Charles E. Wands

[57] ABSTRACT

A telephone service technician's portable computer has a trouble-shooting mechanism which analyzes craftsperson inputs, trouble ticket data, local and remote test data, and suggests a problem solving strategy. The system includes a trouble-shooting application engine, a knowledge database, and a shared, parameter database. The knowledge database contains rules and static parameters which define the characteristics and behavior of the application engine. These rule sets and information are telephone line trouble-shooting specific, based on a diagnostic evaluation of possible line problems, and recommended procedures to repair the line and remove the fault. The shared database data may be supplied from a variety of external sources, such as through a work order manager software application, measurement data sourced by portable test equipment, or data input by the craftsperson.

25 Claims, 3 Drawing Sheets

AUTOMATED TROUBLE-SHOOTING MECHANISM RESIDENT IN CRAFTSPERSON'S PORTABLE TEST AND COMMUNICATIONS DEVICE

CROSS-REFERENCE TO RELATED APPLICATIONS

The present application is a continuation-in-part of co-pending application Ser. No. 235,317 (hereinafter referenced as the '317 application), filed Apr. 29, 1994, entitled: "Telecommunication Test System Including a Test and Trouble Shooting Expert System," by K. R. Selig et al, assigned to the assignee of the present application, and the disclosure of which is herein incorporated. In addition, the subject matter of the present application relates to that described in co-pending application Serial No. *, filed coincidently herewith, by Dana Heins et al, entitled: "Display-Based Control Mechanism Resident in Portable Test and Communications Device for Facilitating Craftsperson's Remote Testing of Selected Portion of Telephone Network," (hereinafter referred to as the Heins et al application) also assigned to the assignee of the present application, and the disclosure of which is incorporated herein.

FIELD OF THE INVENTION

The present invention relates in general to telephone communication systems and networks, and is particularly directed to a new and improved automated trouble-shooting mechanism, resident in and employed by a craftsperson's portable test/communications device, which is operative to generate a trouble-shooting strategy, based upon information and reactional testing, thereby enabling the craftsperson to expeditiously remedy of a problem specified in a trouble ticket issued from a dispatch center.

BACKGROUND OF THE INVENTION

Figure 1:
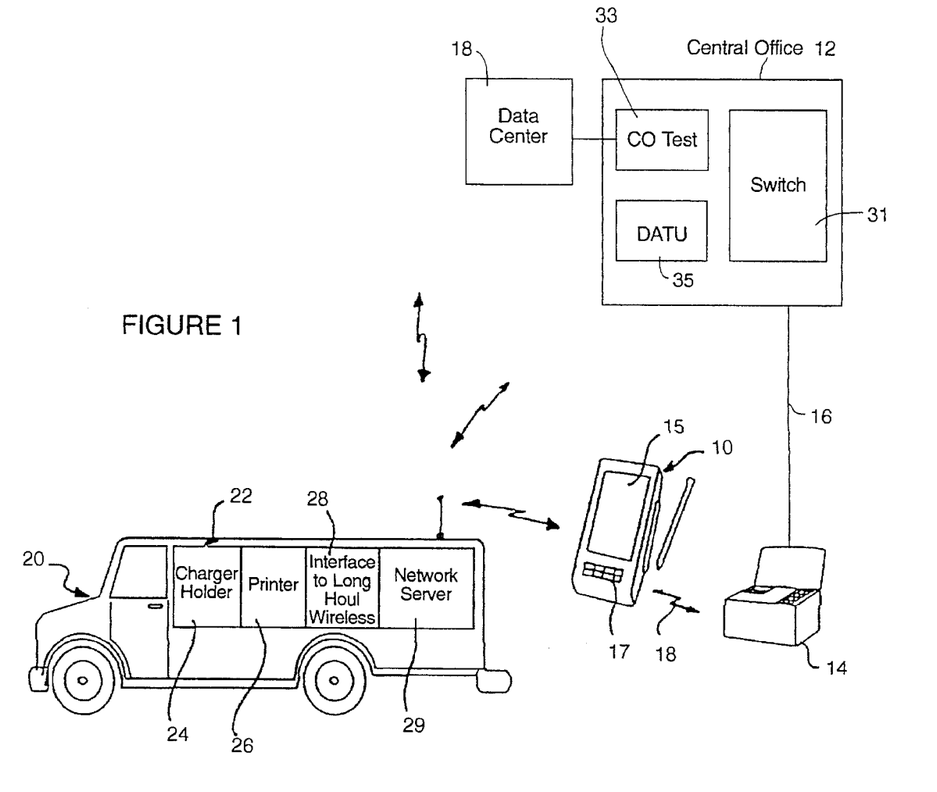
FIG. 1 diagrammatically illustrates the general configuration of the portable telecommunications test system described in the above-referenced co-pending '317 application.

FIG. 1 diagrammatically illustrates the general configuration of the portable telecommunications test system described in the above-referenced co-pending '317 application, the system comprising a hand-held personal computer-based test and communications unit 10, through which a craftsperson, who has been directed by a dispatch center to a service site, which may be remotely located with respect to a central office 12 serving a line to be tested (or line under test (LUT)) 16, may communicate with central office 12 and with a generic test head 14 that is connectable to the LUT 16.

As described in the '317 and Heins et al applications, the test system functionality of the supervisory control mechanism executed by the internal processor of the craftsperson's hand-held computer unit 10 is intended to provide the service technician with a user-friendly, icon-based, test procedure for facilitating the craftsperson performance of various tests on a selected line. In so doing, the craftsperson's portable computer is able to interact with multiple types of existing operational support systems, as well as provide a platform for add-on information exchanges.

For this purpose, via a contact-sensitive (e.g., pen touch-operated) video display panel 15, and an associated keyboard 17 of hand-held computer unit 10, the craftsperson may selectively invoke one or more test operations represented by a set of analysis and test function-associated icons. In response to these selections, the internal control processor of unit 10 executes communication and signal processing operations associated with an identified test. The test head 14 proper performs data acquisition on demand from the personal computer unit 10, including the execution of functional tests. Test head 14 and hand-held personal computer unit 10 can be expanded through plug-in cards and software programs for coupling with various diverse types of communication links.

In order to communicate with a remote network facility (central office 12 or data center 18 associated with the central office 12), the craftsperson's computer unit 10 contains a transceiver interface, which is further interfaced with a communication and signal processing sub-system on board the technician's service vehicle or van 20. The communication and signal processing sub-system on board the van, in turn, links the craftsperson's portable unit 10 with the remote network facility, via either a short haul wireless link, or by way of an auxiliary back-up wireline link. The respective communications interfaces within the craftsperson's portable unit and the van's sub-system may be implemented in the manner described in co-pending application Ser. No. 08/235,317, filed coincident herewith, by Onofrio Schillaci et al, entitled: "Wireless—Wireline Communications Selection Mechanism Resident in Craftsperson's Portable Test and Communications Device" (hereinafter referred to as the Schillaci et al application), assigned to the assignee of the present application and the disclosure of which is herein incorporated.

As further described in the '317 application, the craftsperson may be provided with an auxiliary voice-activated, wireless headset for conducting wireless voice communications with hand-held computer unit. Such a wireless headset can be used with the hand-held computer and the test head to run automated tests, with an audio go/no-go indication of the test results being provided to the craftsperson.

The service van's communication and signal processing sub-system 22 includes a battery holder/charging station 24, a printer 26, a long haul wireless interface 28 and a network server 29. Battery holder/charging station 24 is configured to receive and store the portable hand-held computer unit 10, so that the computer unit 10 may be secured and stowed, and its associated power supply (battery pack) may be recharged, when not in use. Printer 26 is available to print out various test results or other information. Long haul wireless interface 28 provides a wireless gateway to long haul wireless services, while network server 29 contains a file server that provides additional processing power and electronic data storage. Network server 29 is operative to perform auxiliary data processing tasks on demand from the computer unit 10.

Central office facility 12 typically includes a central office switch 31, central office test devices 33, and a line-conditioning device 35, such as a direct access test unit (DATU), or (SASS) transmission conditioning system. The central office test devices 33 are capable of providing an interface with various operational support systems of the data center 18, such as a service vehicle dispatch, outside plant record database, automated testing systems, and electronic network schematics. The line-conditioning device (e.g. DATU or SASS) 35 within central office 12 provides the craftsperson with the ability to selectively conduct a number of tests of a line, by invoking specified key combinations (sequences) from a standard craftsperson's telephone test set.

In the course of conducting a test via test head 14, the craftsperson's personal computer unit 10 receives the measured data from the test head and operates on the data to convert the measurement results into usable parameter information. This usable parameter information is then linked to the service vehicle's communication sub-system 22, so that appropriate commands may be forwarded to a line-conditioning device or automated test equipment in the central office 12.

In a non-limiting example of responding to a trouble ticket that has been issued by a dispatch center and contains a customer service request, the system of FIG. 1 operates as follows. After being dispatched to and travelling to a test site (using service vehicle 20), the craftsperson proceeds to couple the test head 14 to the line under test 16. Using the portable computer unit 10, the technician then establishes communications with the test head 14 and, via the communication sub-system 22 in van 20, with the central office, so that one or more tests of the line may be conducted.

Once the technician has coupled the test head 14 to the line under test, the test application software resident in hand-held computer unit 10 is operative to display icons associated with respective test procedures for evaluating the LUT via the contact-sensitive computer display panel 15. In response to the service technician selecting a desired test function, the resident test software of computer unit 10 proceeds to interactively generate additional menus, through which the craftsperson specifies further choices for defining parameters required for implementing the selected test. Based upon the choices selected by the craftsperson, computer unit 10 assembles and transmits a message to the test head and to the central office for establishing what test or tests are to be conducted and the parameters associated with those tests.

When a selected test is invoked, the test head measures the response of the line to one or more conditions placed on the line, and transmits the test response data back to computer unit 10 for storage in memory and analysis in accordance with an on-board test or line analysis program. Based upon the results of the processed information, the craftsperson may direct the test device to perform one or more additional tests, until the line has been completely tested.

SUMMARY OF THE INVENTION

As pointed out above, the test system functionality of the supervisory control mechanism executed by the internal processor of the craftsperson's hand-held computer unit described in the '317 application is intended to provide the service technician with a user-friendly, icon-based, test procedure for facilitating the craftsperson performance of various tests on a selected line, whereby the craftsperson's portable computer is able to interact with multiple types of existing operational support systems, as well as provide a platform for add-on information exchanges.

The present invention is directed to a particular implementation of such a supervisory control mechanism, which is operative to analyze multiple sources of information, including user inputs from the craftsperson, parametric data embedded in the dispatch (trouble ticket), test data obtained through the execution of local tests, and remote test data (obtained through a system such as a mechanized loop testing (MLT) system), and to derive therefrom a trouble-shooting strategy that will enable the craftsperson to expeditiously determine the cause of the problem that gave rise to the generation of the trouble ticket.

The system architecture of the present invention comprises an information processing sub-system, trouble-shooting application engine, and an associated set of databases, one of which is a knowledge or 'experience' database, and the other of which is a shared, parameter database. The knowledge database contains rules and static parameters which define the characteristics and behavior of the application engine. These rule sets and information are application specific, here—telephone line trouble-shooting specific, having been prepared in accordance with a rigorous diagnostic evaluation of all possible problems that may occur on a line, the potential sources of such problems, and recommended procedures to repair the line and thereby remove the fault. As the system learns new attributes of problems and remedial procedures, the knowledge database is updated to include that information, so as to enable the application engine to make a more informed decision when recommending a trouble-shooting strategy.

The data stored in the shared database may be supplied from a variety of external sources, such as data acquired through an automated craft dispatch—work order manager software application, such as an AT&T CAS (craft access system) application, technician access network (TAN), or automated work administration system (AWAS), measurement data sourced by portable test equipment (PTE), or data input by the user.

The trouble-shooting application engine is operative to use the rules and parameters of the knowledge database to establish a field of possible/probable fault candidates that have relationships or linkages with a critical point of a set of control parameters. The candidates of a given field are those which exhibit one or more symptoms revealed by values of test parameters. Using test parameter data in the shared database, the engine iteratively refines the field of candidates to those containing successively smaller numbers of members, until a most likely candidate as the cause of the problem is established.

In particular, as the shared database is dynamically updated with test result information derived from measurements conducted on the line or from an application system, the application engine processes this information in accordance with the rule set of the knowledge data base and excludes from the field of candidates those points that are no longer sufficiently closely linked to the control point based upon the relationship specified by the control model. Eventually, the field is reduced to a single, most likely fault candidate point, which the engine uses to generate a remedial strategy message to the craftsperson via the computer display screen.

In accordance with the operational flow sequence carried out by the trouble-shooting strategy generating mechanism in accordance with the present invention will be described, when craftsperson is dispatched to a job site, and establishes a communication with the necessary remote facility, such as a central office and associated data center, the technician downloads whatever information is available for the trouble ticket being serviced, which may include the output of exercised test equipment, in order to provide parametric data for the line being serviced, that will enable the application engine to estimate the cause of the fault.

Accompanying the downloaded parametric test data is a prescribed test identification (VER) code that associates the test conducted by the mechanized test equipment with the rule set in the knowledge database. Once the test measurement and data download operation is complete, the user is presented with a display screen that contains a menu of options, that may include further testing of the line, or other functions. Since the application engine generates a trouble-shooting strategy based upon a diagnostically evaluation of the trouble ticket and available measurement data stored in the shared database, the level of experience or skill of the technician will not prevent a successful choice of menu items to accomplish the task.

Each menu screen includes a 'Help" icon. When this icon is invoked, the application engine displays a message to the user indicating the results of its analysis of the information currently available in the knowledge and shared databases and recommends what the technician should do next. The engine then specifies what method is to be carried out based upon the VER code and available parametric test data. Based upon the selected method, a message will be displayed that will instruct the user what should be done.

If preliminary information provided by the trouble ticket and the results of initial test measurements are sufficient for the application engine to determine the cause of a fault, a location and repair scenario message is generated. The application engine is operative to coordinate data gathering and analysis, including invoking of an external test function (e.g. a request to the DATU to open the subscriber line), and the observation or measurement of the line's response to the invoked operation (e.g. reading the response of a test head monitoring that line which, for the example of requesting a DATU to open the line, should cause the test head see no voltage).

If further testing of the line is necessary, a displayed message may instruct the user to again exercise one or more additional tests. Thus, instruction message screens are successively generated, as necessary, and the user is instructed to derive additional information, such as by exercising the test head, until the application engine has refined a field of potential causes to a single probable source. The displayed message not only represents the results of the engine's analysis of the trouble ticket and test and parameter data, but serves to provide practical information to the technician. The craftsperson may then proceed to carry out the suggested correction procedure, to remedy the fault. Upon completion of this exercise, the line may again be tested to verify the repair.

DETAILED DESCRIPTION

Before describing in detail the new and improved automated trouble-shooting mechanism in accordance with the present invention, it should be observed that the present invention resides primarily in what is effectively an information processing sub-system embedded within, and an associated set of databases employed by, the supervisory control software resident in the above-referenced craftsperson's portable computer unit. One of these databases is a knowledge or 'experience' database containing rules and static parameters employed by the information processing sub-system to define its characteristics and behavior. The second database is a shared database in which raw parametric data associated with the line under test is stored. Thus, the information processing sub-system of the present invention effectively constitutes an artificial intelligence, trouble-shooting application, engine, which employs the knowledge and experience rules in the knowledge database to evaluate the data stored in the shared database, in order to reach a recommended course of action that will enable the craftsperson to solve the problem presented on the trouble ticket.

In order not to obscure the disclosure with details which will be readily apparent to those skilled in the art having the benefit of the description to follow, the invention has been illustrated in the drawings in readily understandable block diagram format, which show only those specific details that are pertinent to the present invention, in a convenient functional grouping, so that the present invention may be more readily understood.

Figure 2:
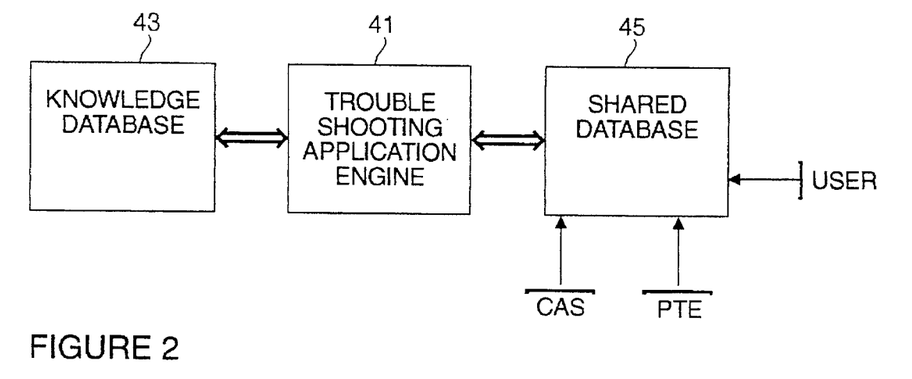
FIG. 2 shows the fundamental system architecture of the present invention as comprising an information processing sub-system, trouble-shooting application engine, and an associated set of knowledge and shared parameter databases.

FIG. 2 shows the fundamental system architecture of the present invention as comprising an information processing sub-system, trouble-shooting application engine 41, and an associated set of databases 43 and 45. Database 43 is a knowledge or 'experience' database containing rules and static parameters which define the characteristics and behavior of engine 41.

As is standard practice in the generation of experience and knowledge driven databases, the rule sets and information stored in database 45 are application specific, here—telephone line trouble-shooting specific, prepared in accordance with a rigorous diagnostic evaluation of all possible problems that may occur on a line, the potential sources of such problems, and recommended procedures to repair the line and thereby remove the fault. Moreover, as the system learns new attributes of problems and remedial procedures associated with those problems, the knowledge database is updated to include that information, so as to enable the application engine to make a more informed decision when recommending a trouble-shooting strategy.

Database 45 is a shared database in which parametric data associated with the line under test is stored. Such data may be sourced from a variety of external sources, such as data acquired through a work order manager software application 51 (e.g. the previously mentioned AT&T CAS (craft access system) application, technician access network (TAN), or automated work administration system (AWAS)), measurement data sourced by portable test equipment (PTE), or data input by the user.), measurement data sourced by portable test equipment (PTE) 52, or by the user 53.

As pointed out briefly above, engine 41 uses the knowledge and experience rules in the knowledge database 43 to evaluate the raw data in the shared database 45, in order to reach a recommended course of action to the craftsperson to solve the problem presented on the trouble ticket. For this purpose, engine 41 may comprise an application engine produced by Stanford University, Palo Alto, Calif., known as 'The Coarse Program Model' which, using the rules and parameters of the knowledge database 43, establishes a field of possible/probable fault candidates that have relationships or linkages with a critical point of a set of control parameters. The candidates of a given field are those which exhibit one or more symptoms revealed by values of test parameters. Then, using test parameter data in the shared database 45 derived from an external source, such as a line measurement test head, or input by the service technician, for example, the engine 41 iteratively refines the field of candidates to those containing successively smaller numbers of members, until a most likely candidate as the cause of the problem is established.

Figure 3:
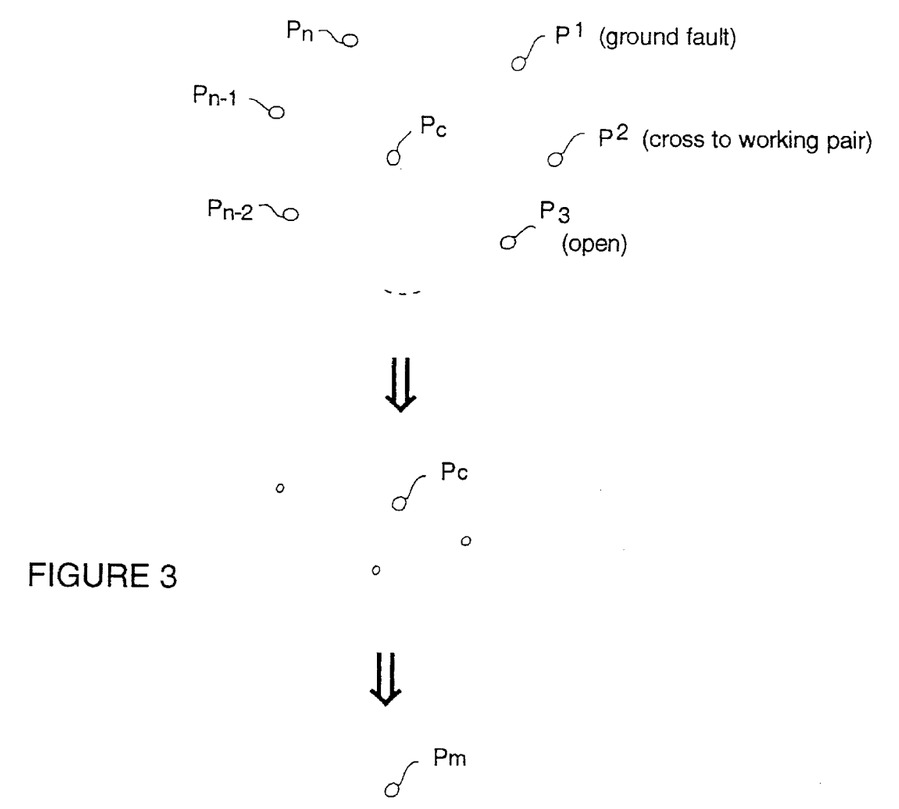
FIG. 3 diagrammatically illustrates a field of candidate points, which are associated with respectively different potential anomaly or fault candidates for the cause of the problem that prompted the generation of a trouble ticket for a given line to be tested.

This operation is diagrammatically illustrated in FIG. 3, which shows a field of candidate points p1, p2, p3, ..., pn, which are associated with respectively different potential anomaly or fault candidates for the cause of the problem that prompted the generation of a trouble ticket for a given line to be tested. In the non-limiting example of FIG. 3, point p1 is associated with a ground fault, point p2 is associated with a cross to a working pair, and point p3 is associated with an open line.

As the databases employed by the application engine are updated with more current information, in particular, as the shared database 45 is dynamically updated with test result information derived from measurements conducted on the line or from an application system, such as data derived from portable test equipment for example, engine 41 processes this information in accordance with the rule set of the knowledge data base and excludes from the field of candidates those points that are no longer sufficiently closely linked to the control point based upon the relationship specified by the control model. Eventually, the field is reduced to a single, most likely fault candidate point pm, which the engine 41 uses to generate a remedial strategy message to the craftsperson via the computer display screen.

Figure 4:
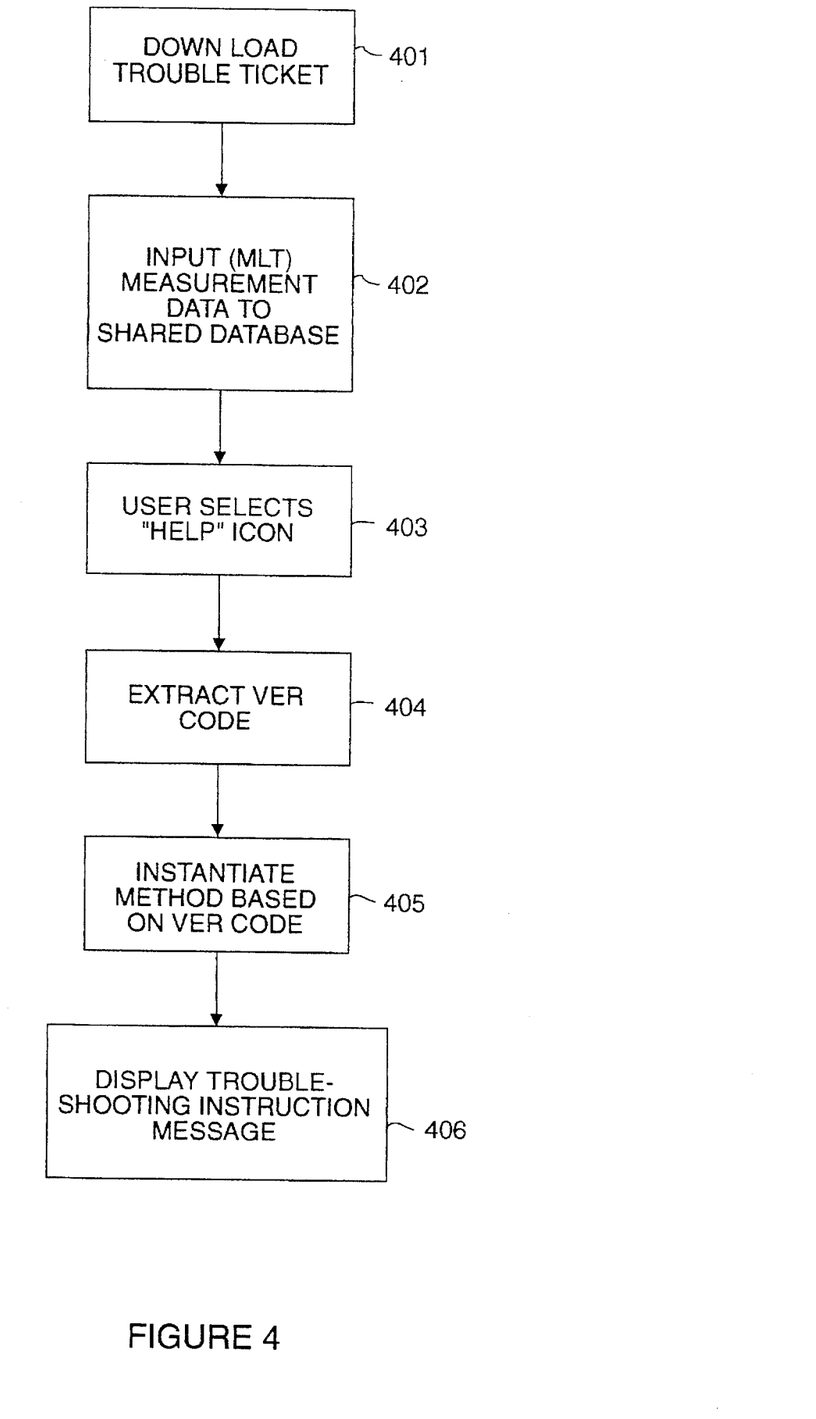
FIG. 4 illustrates respective steps of an operational flow sequence employed in the mechanism for generating a trouble-shooting strategy based upon information and reactional testing, in accordance with an embodiment of the present invention.

Referring now to FIG. 4, the operational flow sequence of a mechanism for generating a trouble-shooting strategy based upon information and reactional testing, in accordance with an embodiment of the present invention will be described. As described in the '317 application, when a subscriber or customer places a service call to an automated service repair facility, the administrator at the repair facility confirms the request and generates a trouble ticket. A craftsperson is then dispatched to a specified location at which the line that prompted the reported problem may be tested and serviced.

Upon arriving at the job site, and establishing a communication with the necessary remote facility (central office and associated data center) via the wireless—wireline communications sub-systems contained in the portable computer unit and service vehicle, as described in the above-referenced Horton et al application, then, in step 401, the technician downloads whatever information is available for the trouble ticket being serviced.

This initial operation customarily involves the use of a work order manager application, such as the above-referenced CAS application, and requires the craftsperson to exercise test equipment, such as a SASS transmission conditioning system, or a direct access test unit (DATU), as described in the above-referenced Heins et al application, in order to provide preliminary parametric data for the line being serviced, that will enable the application engine to estimate the cause of the fault.

As described above, where preliminary information provided by the trouble ticket and the results of initial test measurements are sufficient for the application engine to determine the cause of a fault, a location and repair scenario message is generated. The application engine is operative to coordinate data gathering—by invoking an external test function, and subsequent analysis—by the observation or measurement of the line's response to the invoked operation. For example, the application engine may generate an instruction that requests the DATU 35 to open the subscriber line 16. It then reads the response of the portable test equipment (test head 14) to the invoked stimulus provided by the DATU. For the example of opening the subscriber line, the voltage reading output of the portable test equipment 14 should be zero. The application engine then makes a decision on what is to be done next based upon the monitored PTE output.

In step 402, the measurement data derived from the test equipment is downloaded into the shared database 45. Accompanying the parametric test data itself is a prescribed VER code that associates the test conducted by the mechanized test equipment with the rule set in the knowledge database. Once the test measurement and data download operation is complete, the user is presented with a display screen that contains a menu of options, that may include further testing of the line, or other functions, as described in the '317 application. Since application engine 41 is operative to generate a trouble-shooting strategy based upon a diagnostically evaluation of the trouble ticket and available measurement data stored in the shared database, the level of experience or skill of the technician will not prevent a successful choice of menu items to accomplish the task. While a very experienced craftsperson might readily choose the appropriate test function menu item for the trouble ticket at hand, the incorporation of the trouble-shooting application engine permits a lesser skilled individual to be guided through a problem correction sequence.

For this purpose, each menu screen includes a 'Help' icon. In step 403, when the Help icon is invoked (by the craftsperson pressing a pen against the contact-sensitive screen of the computer unit), the application engine displays a message to the user indicating the results of its analysis of the information currently available in the knowledge and shared databases and recommends what the technician should do next. For this purpose, in response to the technician invoking the 'Help' icon, then in step 404, the application engine extracts the VER code that has been downloaded into the shared database. Next, in step 405, it instantiates what method is to be carried out based upon the VER code. Based upon the selected method, a message will be displayed that will instruct the user what should be done.

More particularly, in step 406, an instruction message associated with the selected method is displayed to the user. For example, if the preliminary information provided by the trouble ticket and the results of the initial MLT measurements are sufficient to arrive at a cause of the fault, a location and repair scenario message might be generated. On the other hand, if further testing of the line is necessary, the displayed message may instruct the user to again exercise one or more additional tests. Namely, help/instruction message screens are successively generated, as necessary, and the user is instructed to derive additional information, for example, by exercising the test head, until the application engine has refined a field of potential causes to a single probable source.

Assuming, for example, that the iterative measurement and evaluation process described above has determined that the cause of the line fault is a ground fault, the following message might be displayed: "The MLT has determined that a ground fault exists. This type of fault occurs mostly in buried cables. Use a ground fault locator and earth gradient frame to locate the fault. Expose the cable at the point of the fault and repair the cable." This message not only represents the results of the engine's analysis of the trouble ticket and test and parameter data, but it serves to provide practical information to the technician (by confirming a choice made by a skilled craftsperson, or supplying on the job training to a lesser skilled individual). The craftsperson may then proceed to carry out the suggested correction procedure, to remedy the fault. Upon completion of this exercise, the line may again be tested to verify the repair.

As will be appreciated from the foregoing description, by incorporating the trouble-shooting mechanism in accordance with the present invention into a telephone service technician's portable computer unit, the ability of a craftsperson who has been dispatched to a service site to expeditiously remedy a problem of a trouble ticket is enhanced, regardless of the level of skill of the service technician. By analyzing multiple sources of information, including user inputs from the craftsperson, parametric data embedded in the dispatch (trouble ticket), test data obtained through the execution of local tests, and remote test data (obtained through a system such as a mechanized loop testing (MLT) system), the trouble-shooting mechanism of the present invention is able to rapidly derive and suggest to the technician a problem solving strategy that is both deterministically accurate and instructive.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. A method of providing a craftsperson with a trouble-shooting strategy that will provide said craftsperson with an indication of the probable cause of a problem in a subscriber line and a suggested procedure for solving said problem, comprising the steps of:

(a) providing a communication and processing unit through which a craftsperson, who may be dispatched to a service site that is remotely located with respect to a telephone office serving said subscriber line, may communicate with a test system of said telephone office and with a test head that is connectable to said subscriber line, said communication and processing unit having an input/output device, including a visual display, through which information input by said craftsperson is converted into prescribed control signals and transmitted to said test system and through which information associated with the operation of said test system is presented to said craftsperson; and (b) providing, in said communication and processing unit, an information processing, trouble-shooting application engine, and first and second databases coupled thereto, said first database being a knowledge database containing rules and static parameters which define the characteristics and behavior of said application engine, said second data base being a shared database which stores parameter data associated with one or more tests conducted on said line, said trouble-shooting application engine being operative to perform a diagnostic evaluation of data in said shared database, in accordance with rule sets stored in said knowledge data base and to generate a proposed solution to the problem in said line that will guide said craftsperson to remove the fault.

2. A method according to claim 1, wherein said application engine is operative to execute a diagnostic evaluation of a plurality of possible problems that may occur on said line, potential sources of said possible problems, and recommended procedures to repair said line.

3. A method according to claim 1, wherein data stored by said shared database includes data acquired through one or more of a work order manager software application, measurement data sourced by portable test equipment, and data input by said craftsperson.

4. A method according to claim 1, wherein parametric test data stored in said shared database has a test identification code that associates a test conducted by test equipment with a rule set in said knowledge database, in response to which said trouble-shooting application engine generates a trouble-shooting strategy based upon a diagnostic evaluation of a trouble ticket reporting said problem and said parametric measurement data stored in said shared database.

5. A method according to claim 1, wherein said trouble-shooting application engine is operative to generate a prescribed symbol on said display screen, which symbol, when invoked by said craftsperson, causes said engine to display a message indicating results of said engine's analysis of information currently available in said knowledge and shared databases and suggesting a course of action to said craftsperson to solve said problem.

6. A supervisory control mechanism, which is contained in a portable test unit employed by a craftsperson to test a communication line, said supervisory control mechanism comprising an information processing, trouble-shooting application engine, and first and second databases coupled thereto, said first database being a knowledge database containing rules and static parameters which define the characteristics and behavior of said application engine, said second data base being a shared database which stores parameter data associated with one or more tests conducted on said line, said trouble-shooting application engine being operative to analyze multiple sources of information, including user inputs from said craftsperson, parametric data embedded in a problem dispatch, test data obtained through the execution of local tests, and remote test data, and to derive therefrom a trouble-shooting strategy that is output to said craftsperson, so as to enable said craftsperson to locate the cause of a problem that gave rise to the generation of said problem dispatch.

7. A supervisory control mechanism according to claim 6, wherein said rules and static parameters which define the characteristics and behavior of said application engine are prepared in accordance with a diagnostic evaluation of a plurality of problems that may occur on said line, the potential sources of such problems, and recommended procedures to solve said problem.

8. A supervisory control mechanism according to claim 7, wherein said trouble-shooting application engine is operative to use the rules and parameters of said knowledge database to establish a field of possible/probable fault candidates that have relationships or linkages with a critical point of a set of control parameters and, using test parameter data in said shared database, iteratively refining said field of candidates to those containing successively smaller numbers of members, until a most likely candidate as the cause of the problem is established, said trouble-shooting application engine using said most likely fault candidate point to generate a remedial strategy message to said craftsperson.

9. A supervisory control mechanism according to claim 6, wherein parametric test data stored in said shared database has a test identification code that associates a test conducted by test equipment with a rule set in said knowledge database, in response to which said trouble-shooting application engine generates a trouble-shooting strategy based upon a diagnostic evaluation of a trouble ticket reporting said problem and said parametric measurement data stored in said shared database.

10. A supervisory control mechanism according to claim 6, wherein said trouble-shooting application engine is operative to generate a prescribed symbol on said display screen, which symbol, when invoked by said craftsperson, causes said engine to display a message indicating results of said engine's analysis of information currently available in said knowledge and shared databases and suggesting a course of action to said craftsperson to solve said problem.

11. A supervisory control mechanism according to claim 6, wherein said application engine is operative to execute a diagnostic evaluation of a plurality of possible problems that may occur on said line, potential sources of said possible problems, and recommended procedures to repair said line.

12. A supervisory control mechanism according to claim 6, wherein data stored by said shared database includes data acquired through one or more of a work order manager software application, measurement data sourced by portable test equipment, and data input by said craftsperson.

13. A mechanism for enabling a craftsperson's communication and processing unit to provide a craftsperson, who has been dispatched to a service site that is remotely located with respect to a telephone facility serving a subscriber line, with a trouble-shooting procedure through which said craftsperson may locate and solve the probable cause of a problem in said subscriber line, said communication and processing unit being operative to communicate with a test system of said telephone facility and with a test head that is connectable to said subscriber line, said communication and processing unit having an input/output device, including a visual display, through which information input by said craftsperson is converted into prescribed control signals and transmitted to said test system and through which information associated with the operation of said test system is presented to said craftsperson, said mechanism comprising an information processing, trouble-shooting application engine, and first and second databases coupled thereto, said first database being a knowledge database containing rules and static parameters which define the characteristics and behavior of said application engine, said second data base being a shared database which stores parameter data associated with one or more tests conducted on said line, said trouble-shooting application engine being operative to perform a diagnostic evaluation of data in said shared database, in accordance with rule sets stored in said knowledge data base and to display a message containing a proposed procedure to be carried out by said craftsperson to located and solve said problem in said subscriber line.

14. A mechanism according to claim 13, wherein data stored by said shared database includes data acquired through one or more of a work order manager software application, measurement data sourced by portable test equipment, and data input by said craftsperson.

15. A mechanism according to claim 13, wherein parametric test data stored in said shared database has a test identification code that associates a test conducted by test equipment with a rule set in said knowledge database, in response to which said trouble-shooting application engine generates a trouble-shooting strategy based upon a diagnostic evaluation of a trouble ticket reporting said problem and said parametric measurement data stored in said shared database.

16. A mechanism according to claim 13, wherein said trouble-shooting application engine is operative to generate a prescribed symbol on said display screen, which symbol, when invoked by said craftsperson, causes said engine to display a message indicating results of said engine's analysis of information currently available in said knowledge and shared databases and suggesting a course of action to be followed by said craftsperson to solve said problem on said subscriber line.

17. A method of providing a trouble-shooting strategy to a craftsperson, who is dispatched to a service site that is located remotely with respect to a telephone facility serving a subscriber line, said trouble-shooting strategy providing said craftsperson with an indication of the probable cause of a problem in said subscriber line and a suggested procedure for solving said problem, comprising the steps of:

(a) providing said craftsperson with a communication and signal processing craft unit through which said craftsperson may communicate with said telephone facility and with test equipment that is connectable to said subscriber line, said craft unit having an input/output device, including a visual display panel, through which information input by said craftsperson is converted into prescribed signals and transmitted to a test system of said telephone facility and through which information associated with the operation of said test system is presented to said craftsperson, said test system being operative to respond to command signals supplied thereto from said craft unit and to apply to said subscriber line prescribed test stimuli, responses of said subscriber line to which are measured by said test equipment; and (b) providing, in said craft unit, an information processing, trouble-shooting application engine, and first and second databases coupled thereto, said first database being a knowledge database containing rules and static parameters which define the characteristics and behavior of said application engine, said second data base being a shared database which stores parameter data associated with one or more tests conducted on said line, said trouble-shooting application engine being operative to perform a diagnostic evaluation of data in said shared database, in accordance with rule sets stored in said knowledge data base, by coordinating the application of a stimulus to said subscriber line by said test system and analyzing the output of said test equipment to said stimulus, and to generate said proposed solution to the problem in said subscriber line that will guide said craftsperson to remove the fault.

18. A method according to claim 17, wherein said test unit comprises a direct access test unit.

19. A method according to claim 18, wherein said direct access test unit is configured to respond to commands from said craft unit and to supply audio messages so as to enable said craftsperson to control the operation of said direct access test unit and thereby test said subscriber line, said commands being converted into tone signals and transmitted to said direct access test unit, and wherein information associated with the operation of said direct access test unit is presented by said visual display to said craftsperson, said displayed information being interactively updated in response to one or more inputs via said craft unit by said craftsperson, irrespective of the generation of audio messages by said direct access test unit.

20. A method according to claim 17, wherein said application engine is operative to cause a menu of various tests that may be conducted upon said subscriber line by said test system to be displayed via said visual display in response to information, a request for which has been displayed, having been input via said input/output device of said craft unit.

21. A method according to claim 20, wherein said application engine is operative to cause said menu of various tests that may be conducted upon said subscriber line by said test system to be displayed simultaneously via said visual display, while audio messages associated with different test functions that may be performed by said test system are being sequentially generated.

22. A method according to claim 17, wherein said application engine is operative to execute a diagnostic evaluation of a plurality of possible problems that may occur on said line, potential sources of said possible problems, and recommended procedures to repair said line.

23. A method according to claim 17, wherein data stored by said shared database includes data acquired through one or more of a work order manager software application, measurement data sourced by said test equipment, and data input by said craftsperson.

24. A method according to claim 17, wherein parametric test data stored in said shared database has a test identification code that associates a test conducted by test equipment with a rule set in said knowledge database, in response to which said trouble-shooting application engine generates a trouble-shooting strategy based upon a diagnostic evaluation of a trouble ticket reporting said problem and said parametric measurement data stored in said shared database.

25. A method according to claim 17, wherein said trouble-shooting application engine is operative to generate a prescribed symbol on said display screen, which symbol, when invoked by said craftsperson, causes said engine to display a message indicating results of said engine's analysis of information currently available in said knowledge and shared databases and suggesting a course of action to said craftsperson to solve said problem.

* * * * *